(12) United States Patent
Nagae

(10) Patent No.: US 7,321,342 B2
(45) Date of Patent: Jan. 22, 2008

(54) IMAGE DISPLAY SYSTEM

(75) Inventor: Nobukazu Nagae, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 596 days.

(21) Appl. No.: 10/734,278

(22) Filed: Dec. 15, 2003

(65) Prior Publication Data

US 2004/0125098 A1    Jul. 1, 2004

(30) Foreign Application Priority Data

Dec. 16, 2002   (JP) .............................. 2002-363243

(51) Int. Cl.
*G09G 5/00*      (2006.01)
*G01C 21/32*   (2006.01)
*G01C 21/00*   (2006.01)

(52) U.S. Cl. ...................... 345/2.1; 345/2.3; 701/213; 701/211

(58) Field of Classification Search .......... 345/1.1–1.3, 345/2.1–2.3, 3–5, 55, 76, 87, 156, 168, 169; 349/1, 17; 701/213, 200, 207, 211
See application file for complete search history.

(56) References Cited

U.S. PATENT DOCUMENTS 6,172,657 B1 *   1/2001   Kamakura et al. .............. 345/8
6,249,744 B1 *   6/2001   Morita ........................ 701/213
6,340,957 B1     1/2002   Adler et al.
6,710,754 B2 *   3/2004   Hanson et al. ............... 345/2.1
2002/0190947 A1 * 12/2002  Feinstein ..................... 345/158
2003/0098832 A1   5/2003   Fraser et al. .................. 345/87
2003/0151562 A1 * 8/2003   Kulas ........................... 345/1.1
2004/0041788 A1 * 3/2004   Ternullo ...................... 345/158
2004/0125085 A1 * 7/2004   Kotzin ........................ 345/169

FOREIGN PATENT DOCUMENTS

JP    2001071966 A *  3/2001

* cited by examiner

*Primary Examiner*—Amr A. Awad
*Assistant Examiner*—Stephen Sherman
(74) *Attorney, Agent, or Firm*—Harness, Dickey & Pierce, PLC (57) ABSTRACT

An image display system includes at least one display panel, a memory circuit, and a position sensing subsystem. The memory circuit stores image information, associated with positions within a space in which the at least one display panel is provided, at least temporarily. The position sensing subsystem detects the position of the at least one display panel within the space. The at least one display panel presents at least a portion of the image information thereon according to its position that has been detected by the position sensing subsystem in the space.

15 Claims, 4 Drawing Sheets

DISPLAY AREA

52a, 52b

FRONT

BACK

IMAGE DISPLAY SYSTEM

BACKGROUND OF THE INVENTION

1. Field of the Invention

The present invention generally relates to an image display system and more particularly relates to an image display system that uses a display panel on the move.

2. Description of the Related Art

Recently, flat panel displays (FPDs) have been used more and more frequently.

Specifically, the FPDs currently used extensively are roughly classifiable into large-sized FPDs (for TV receivers, for example) and small-sized FPDs (for mobile electronic appliances, for example). Among these FPDs, liquid crystal displays (LCDs) and organic EL displays (OELDs) are used more extensively than any other FPD such as a plasma display panel (PDP). This is because the LCDs and OELDs are much more lightweight, and much less power-dissipating, than the PDPs, and can be used very effectively in mobile electronic appliances, in particular. Meanwhile, a technique of forming a crystalline semiconductor film of quality at a relatively low temperature has been remarkably developed recently. As a result, a so-called "system LCD", including an embedded CPU in an LCD panel, is about to be put on the market.

SUMMARY OF THE INVENTION

In order to further improve the performance of easily portable display panels (e.g., LCDs), an object of the present invention is to provide users with a novel image display system as a new tool for using such a display panel even more conveniently.

An image display system according to a preferred embodiment of the present invention preferably includes at least one display panel, a memory circuit, and a position sensing subsystem. The memory circuit preferably stores image information, associated with positions within a space in which the at least one display panel is provided, at least temporarily. The position sensing subsystem preferably detects the position of the at least one display panel within the space. The at least one display panel preferably presents at least a portion of the image information thereon according to its position that has been detected by the position sensing subsystem in the space.

In one preferred embodiment of the present invention, the position sensing subsystem preferably includes a detecting subsystem for detecting the configuration of the at least one display panel within the space, and the at least one display panel preferably presents at least a portion of the image information thereon according to its position and configuration that have been detected by the position sensing subsystem.

In another preferred embodiment, the image display system preferably further includes a display data generator for recognizing an image memory area and resolution of the at least one display panel and supplying at least a portion of the image information to the at least one display panel according to the image memory area and resolution recognized.

In this particular preferred embodiment, the display data generator preferably selects at least the portion of the image information according to the image memory area and resolution recognized, and preferably compresses or expands the selected portion of the image information if necessary.

In still another preferred embodiment, the at least one display panel preferably presents the portion of the image information in actual dimensions.

In yet another preferred embodiment, the position sensing subsystem preferably detects the position and/or configuration of the at least one display panel within the space at regular time intervals, and the at least one display panel preferably refreshes the information on its display screen at the regular time intervals.

In yet another preferred embodiment, the position sensing subsystem preferably includes: at least one oscillator, which forms an integral part of the at least one display panel; and a position sensing detector, which is provided within the space where the display panel is arranged and which detects at least the position of the display panel within the space in response to a signal that has been transmitted from the at least one oscillator.

In this particular preferred embodiment, the at least one display panel preferably includes a main display panel and a sub-display panel. The at least one oscillator preferably forms an integral part of the main display panel. The display system preferably further includes a relative position sensing subsystem for detecting the relative positions and relative configurations of the main and sub-display panels. The position and configuration of the sub-display panel within the space are preferably detected based on the relative positions of the main and sub-display panels.

More specifically, multiple display panels, including the at least one display panel, are preferably provided. The at least one oscillator is preferably attachable to, and removable from, any of the multiple display panels. The display panel with the at least one oscillator attached thereto preferably functions as the main display panel.

Alternatively or additionally, the relative position sensing subsystem preferably detects the relative positions and the relative configurations by using an electromagnetic wave.

In a specific preferred embodiment, the electromagnetic wave is preferably an infrared ray.

Alternatively, the relative position sensing subsystem may detect the relative positions and the relative configurations by using a magnetic field.

In yet another preferred embodiment, multiple display panels, including the at least one display panel, are preferably provided. Each of the multiple display panels preferably includes the memory circuit, and preferably extracts an associated portion of the image information according to its position that has been detected within the space by the position sensing subsystem and preferably presents the extracted portion thereon.

In yet another preferred embodiment, the portion of the image information, which is associated with the position within the space, is preferably information that would be unavailable to users without this image display system.

In yet another preferred embodiment, the image information is preferably associated with absolute positions within the space. In a specific preferred embodiment, the image information preferably includes pictures of piping and/or wiring provided near the space. Alternatively, the image information may include information representing an intensity distribution of an electromagnetic wave in the space.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, the configuration and operation of an image display system 100 according to a preferred embodiment of the present invention will be described with reference to FIG. 1.

Figure 1:
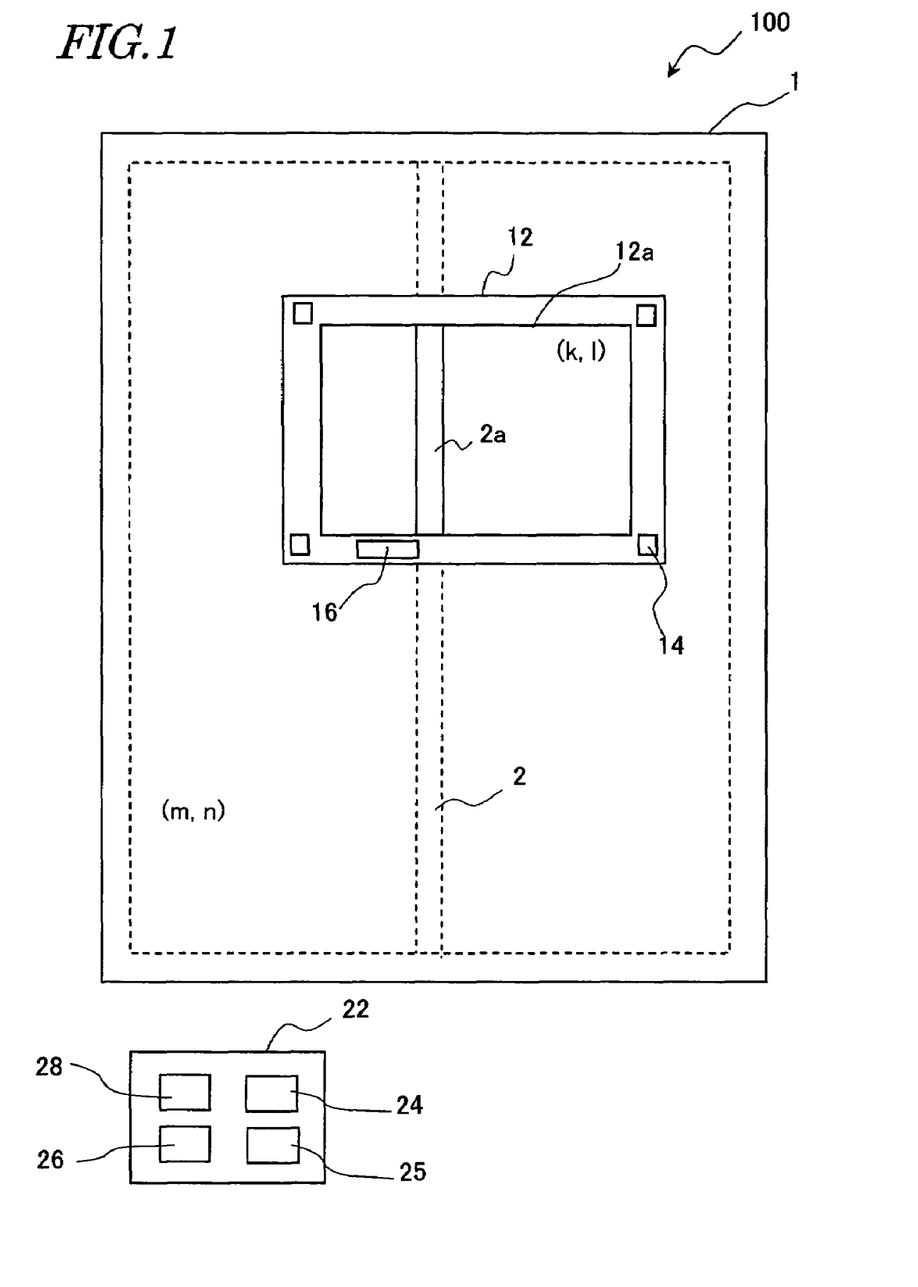
FIG. 1 schematically illustrates a configuration for an image display system 100 according to a preferred embodiment of the present invention.

As shown in FIG. 1, the image display system 100 of this preferred embodiment preferably includes a display panel 12 and a computer (information processor) 22. The computer 22 preferably includes a memory circuit 25 to store image information, which is associated with the position of the display panel 12 within a space (e.g., a room) 1, at least temporarily. The computer 22 may be located either inside or outside of the space 1.

The image display system 100 preferably further includes a position sensing subsystem for detecting the position of the display panel 12 within the space 1. In the example illustrated in FIG. 1, the position sensing subsystem is preferably made up of an oscillator 14, which forms an integral part of the display panel 12, and a position sensing detector 24 for detecting the position of the display panel 12 within the space 1 in response to a signal that has been transmitted from the oscillator 14. The position sensing detector 24 typically includes a receiver (not shown) for receiving the output signal of the oscillator 14 and an arithmetic and logic unit (not shown, either) for calculating the position of the display panel 12 in response to the signal. Alternatively, the processing to be carried out by the position sensing detector in FIG. 1 may be naturally executed by a computer program.

The display panel 12 preferably presents at least a portion of the image information on its display area 12a according to its position that has been detected by the position sensing subsystem within the space 1. For example, the memory circuit 25 may store image information, representing a pipe 2 that is provided under the floor of the space 1, in an image memory area (m, n). In that case, when the overall image information is associated with the image memory area (m, n), the display panel 12 may present a portion 2a of the image information, which is associated with an image memory area (k, l), on the display area 12a. The image memory area (m, n) is associated with positions within the space 1. The memory circuit 25 extracts a portion of the image information, which is associated with the image memory area (k, l) on the display area 12a, according to the position of the display panel 12 and supplies the extracted portion of the image information (which will be referred to herein as "display information") to the display panel 12. This display information may be transmitted from the transmitter 26 of the computer 22 to the receiver 16 of the display panel 12.

Thus, if the user of this image display system 100 puts the display panel 12 on the floor of the space 1, then the image 2a of the pipe 2, which is located at a position corresponding to that of the display panel 12, is presented on the display area 12a. That is to say, information that would be unavailable to the user without this image display system and that is associated with the position of the display panel 12 within the space 1 is now available to him or her.

In the example described above, the image information stored in (the image memory area (m, n) of) the memory circuit 25 represents the pipe 2 that is provided under the floor. However, the image information may also include information representing a pipe provided near the wall or the ceiling. That is to say, the image information stored in the image memory area (m, n) of the memory circuit 25 may be just a portion of the overall image information stored in the memory circuit 25. Thus, the memory circuit 25 may include another image memory area (m', n') to store another portion of the image information representing a pipe that is provided behind the ceiling. In that case, in finding the image memory area of the memory circuit 25 that corresponds to the image memory area (k, l) of the display panel 12, either the image memory area (m, n) or the image memory area (m', n') may be selected according to the position of the display panel 12.

It should be noted that it is normally impossible to associate the image memory area (k, l) in the display area 12a of the display panel 12 with the image memory area (m, n) of the memory circuit 25 just by the position of the display panel 12 within the space 1 (e.g., the position of the center of mass thereof). For that reason, the position sensing subsystem preferably includes a subsystem for detecting the configuration (or direction) of the display panel 12 within the space 1. Thus, the display panel 12 preferably presents at least a portion of the image information thereon according to the position and configuration that have been detected by the position sensing subsystem. The configuration of the display panel 12 may be defined by providing a plurality of oscillators 14 for the display panel 12 as shown in FIG. 1 and by detecting the positions of the oscillators 14 in the space 1 based on the respective output signals of the oscillators 14. Depending on the type or application of the image information to be provided, just by defining the configuration (or direction) of the display panel 12 in the space 1 beforehand, the two image memory areas (k, l) and (m, n) may be easily associated with each other only by the position of the display panel 12.

In associating the image memory area (k, l) of the display panel 12 with the image memory area (m, n) of the memory circuit 25, however, the resolution of the display panel 12 affects its precision. Particularly when the image 2a of the pipe 2 should be displayed in its actual dimensions as schematically shown in FIG. 1, a display data generator 28 is preferably provided for the computer 22. The display data generator 28 preferably selects (or decimates) a portion of the image information in the image memory area (m, n) according to the resolution of the display panel 12 or compresses or expands the selected image information if necessary.

Also, the position sensing subsystem preferably detects the position and/or configuration of the display panel 12 within the space 1 at regular time intervals, while the display panel 12 preferably refreshes the information on its display screen at the regular time intervals. Then, an image associated with the position of the display panel 12 can be presented in real time while the display panel 12 is moved within the space 1. In the example illustrated in FIG. 1, the image 2a of the pipe 2 under the floor can be viewed in real time and in its actual dimensions while the display panel 12 is moved from one position to another. The rate (or the period) at which the displayed image is refreshed may be appropriately determined depending on the specific application.

In this manner, the image display system 100 of this preferred embodiment of the present invention allows the user to view an image of a normally invisible object in real time and in its actual dimensions. For example, by using this image display system 100, the user can check the arrangement of piping on the spot and can repair the piping just as intended. In the preferred embodiment described above, the image information presented on the display panel 12 of the image display system 100 represents pipes that are provided under the floor or behind the ceiling. However, the image information to be provided does not have to be those pipes, but may also represent the arrangement of wiring or any other utility equipment or the intensity distribution of electromagnetic waves within the space. These types of image information may be associated with positions within the space 1 but may also be associated with absolute positions if the space 1 is defined outdoors, for example. Naturally, relative positions within the space 1 (e.g., room) may also be associated with absolute positions. The relative positions within the space can be easily associated with the absolute positions through simple calculations.

Also, in the preferred embodiment described above, the memory circuit 25 of the computer 22 stores the image information thereon and supplies a portion of the information to be presented to the display panel 12. Alternatively, the memory circuit 25 (and the display data generator 28 as well if necessary) may be provided for the display panel 12 such that the computer 22 just supplies the positional information of the display panel 12. In that case, the display panel 12 can be in charge of the image information processing, thus shortening the time it takes to complete the image processing (i.e., to refresh the information on the screen fully) and conducting the display operation more smoothly.

Furthermore, the memory circuit 25 does not have to always store the image information thereon but may receive the image information from another host computer (not shown) only when it is necessary. For example, upon the user's request, the memory circuit 25 may receive and store image information representing wiring or piping.

The image display system 100 of this preferred embodiment may not only present image information that is associated with a position within the space as described above but may also be used just like the conventional display system. That is to say, the image display system 100 may also present some image information thereon continuously irrespective of the position of the display panel 12. Thus, the image display system 100 may be designed so as to selectively present either normal image information or position-related image information according to the type of the image information and/or the user's request.

In the preferred embodiment described above, the image information to be presented by the image display system 100 is directly associated with the given position within the space (i.e., the image information representing the pipe changes with the position of the pipe within the space). However, the image information presented may also be indirectly associated with the position within the space. That is to say, even if the image information itself is a normal image such as a video that has nothing to do with any position within the space, that type of image information may also be intentionally associated with some position within the space. Then, the image information may also be regarded as "image information associated with a position within the space" as used herein. In that case, as the display panel 12 is shifted within the space 1, a portion of the video to be presented on the display panel 12 will change. This is something like shifting the screen with respect to the fixed video being projected thereto from a projection type display system. That is to say, even if the user's hand holding the display panel 12 thereon has moved, the video presented thereon will not be blurred normally. However, if the display panel 12 has deviated from a predetermined plane, then the image itself may change or even disappear.

The display panel 12 of the image display system 100 is preferably a thin and lightweight display panel, which is suitable to the application described above. Examples of preferred display panels include LCD panels, OELD panels, FEDs and electrophoretic display panels. The display panel may have a size of 8 inches to 10 inches. Optionally, the display panel 12 and the computer 22 may be combined together. In that case, a "system display panel", in which part or all of the circuits of the computer 22 are integrated with the substrate of the display panel 12, is particularly preferred. Then, the display panel 12 preferably further includes a communications circuit so as to receive necessary image information by some wireless communication technique.

Figure 2:
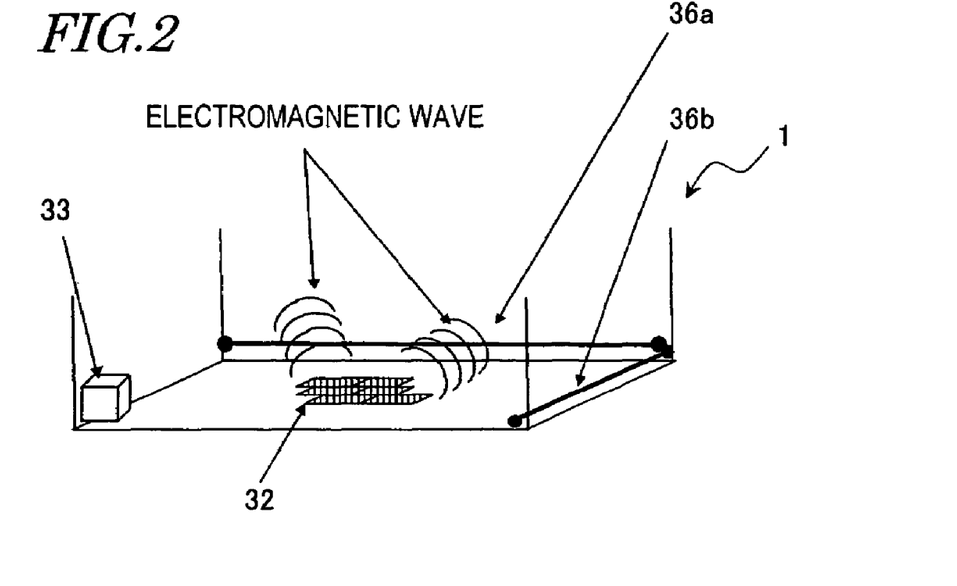
FIG. 2 schematically illustrates an image display system according to another preferred embodiment of the present invention.

FIG. 2 schematically shows a configuration for an image display system according to another preferred embodiment of the present invention.

As shown in FIG. 2, this image display system preferably includes a plurality of display panels 32 and a computer 33. In substantially the same way as the display panel 12 shown in FIG. 1, each of these display panels 32 presents an image, associated with its position within the space 1, thereon in real time and in its actual dimensions. By using a number of display panels 32, a big screen display is realized. Also, since the user can freely change the arrangement of these display panels 32, the user can use these display panels 32 as if he or she were changing the shape of a big screen arbitrarily.

The image display system shown in FIG. 2 also includes a position sensing subsystem. The position sensing subsystem preferably includes an x sensor 36a and a y sensor 36b, which are provided within the space (typically a room) 1, and oscillators included in the respective display panels 32. The x and y sensors 36a and 36b detect the output signals (typically in electromagnetic waves) of the oscillators of the respective display panels 32, thereby detecting the positions of the respective display panels 32. Next, the positional information thus obtained is supplied to the computer 33 and then a display operation is performed as in the image display system 100 shown in FIG. 1.

Figure 3:
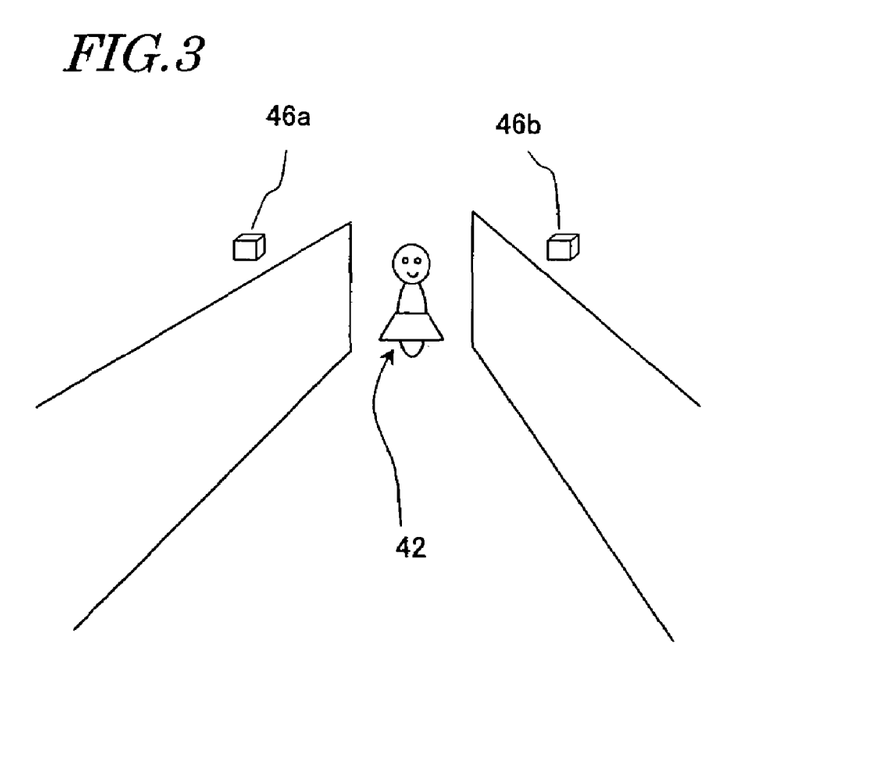
FIG. 3 schematically illustrates an image display system according to still another preferred embodiment of the present invention.

The image display systems of the preferred embodiments of the present invention described above are supposed to be used in a closed space such as a room. However, the present invention is in no way limited to those specific preferred embodiments. Alternatively, the present invention can also provide an image display system that can be used outdoors as shown in FIG. 3. In the example illustrated in FIG. 3, the image information associated with a position within the space may represent a gas tube that is buried underground, for example, and the terminal devices 46a and 46b of a host computer (not shown) may function just like the computer 22 of the image display system 100, thereby presenting a picture of the tube on the display panel 42 in real time and in its actual dimensions. Optionally, the image information provided by the terminal devices 46a and 46b may be selected (e.g., the gas tube information may be switched into water pipe information, or vice versa) in response to the request from the display panel 42. The information may be exchanged between the terminal device 46a or 46b and the host computer via a telecommunications line by a known technique. For example, the terminal devices 46a and 46b may be arranged around the town at regular intervals such that the gas tube installation work can be done with gas tubes monitored in their actual dimensions on the spot. As a result, the installation work can be carried out much more efficiently and safely.

Hereinafter, it will be described with reference to FIGS. 4A and 4B how to perform a display operation with a plurality of display panels 52a through 52g.

As described above, by using a number of display panels 52a through 52g, a big screen display is realized. Also, since the user can freely change the arrangement of these display panels 52a through 52g, the user can use these display panels 52a through 52g as if he or she were changing the shape of the big screen arbitrarily. In addition, if the number of display panels 52a through 52g used is changed, then the area of the display screen can also be changed.

The image display system according to any of various preferred embodiments of the present invention presents image information that is associated with a position within a given space. Accordingly, unlike the tiling-type display system disclosed in Japanese Laid-Open Publication No. 11-134087 (corresponding to U.S. Pat. No. 6,340,957 B1, the entire contents of which are herein incorporated by reference), the plurality of display panels does not function as one virtual big screen but each of those display panels presents image information, associated with its position within the given space, at its own position.

Figure 4A:
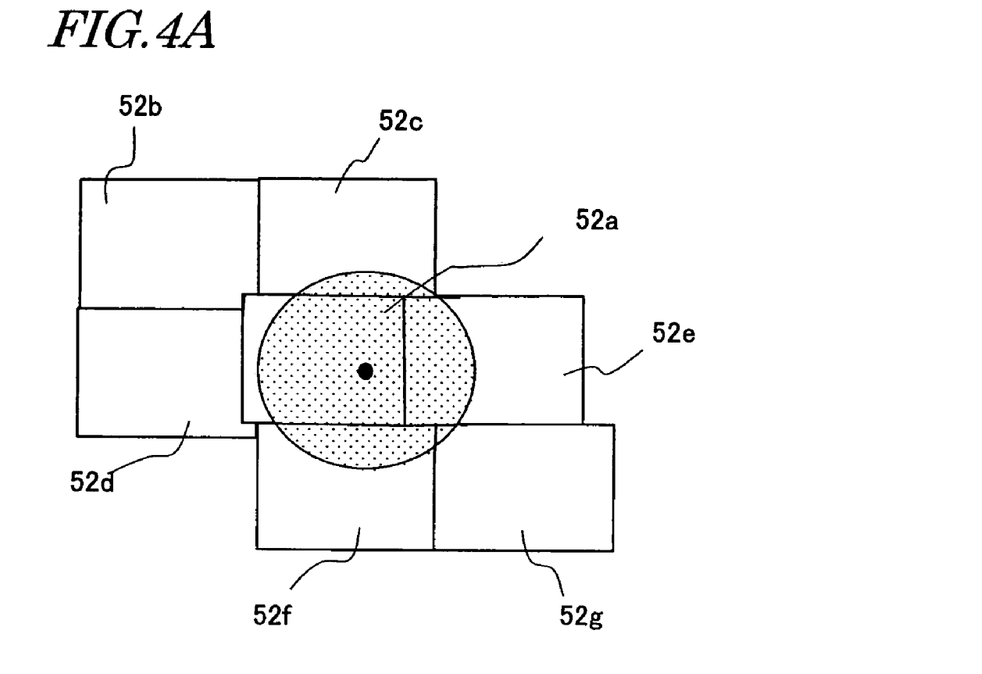
FIGS. 4A and 4B schematically show how a plurality of display panels performs a display operation in an image display system according to a preferred embodiment of the present invention.

As shown in FIG. 4A, even if the multiple display panels 52a through 52g partially overlap with each other, the image display system of the present invention can also present an image thereon normally. That is to say, the image memory area (m, n) to present the position-associated image information thereon preferably provides a spatially fixed image (which may sometimes be not displayed at all), and the multiple display panels 52a through 52g respectively present their associated portions of the image information in the image memory sub-areas (k, 1)a through (k, l)g of the image memory area (m, n). Accordingly, even if the relative positions of the display panels 52a through 52g are changed within the space corresponding to the image memory area (m, n), the image to be presented will be the same.

Figure 4B:
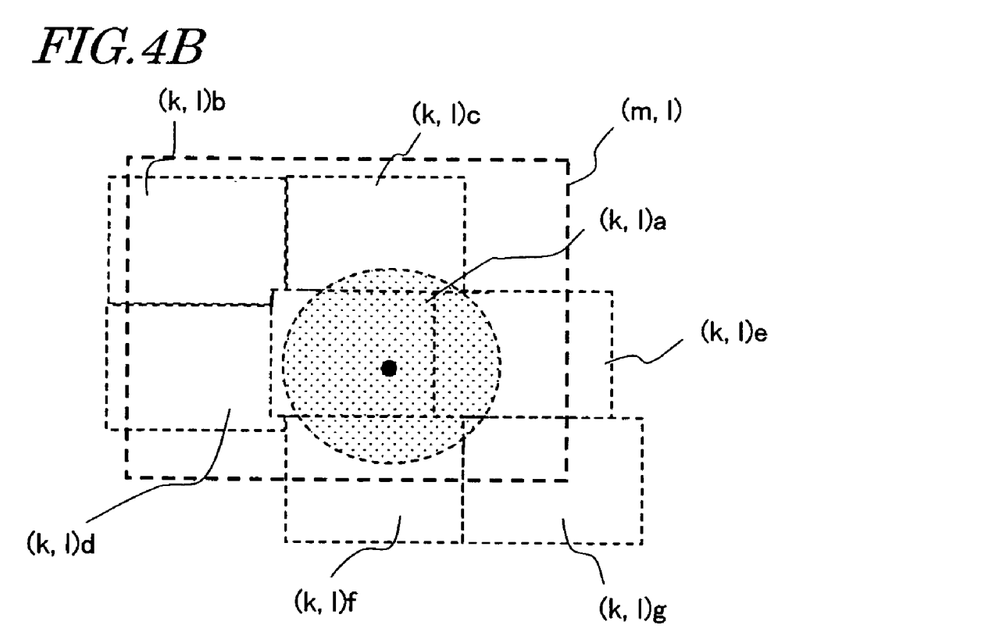

For example, in FIG. 4B, even if the display panels 52a and 52b have exchanged positions with each other, the image to be presented will not change. Thus, the black point at the center of the hatched circle will be presented by the display panel 52b that has just been shifted to the position where the display panel 52a was.

The image display system of the present invention may be used in this manner. For that reason, each of those display panels 52a through 52g preferably has as high a display area ratio as possible. As used herein, the "display area ratio" is the ratio of the effective display area (except the picture-frame area) to the overall surface area. In other words, the picture-frame area is preferably as small as possible. This is because if the picture-frame areas are included in the overlapping portions of the display panels, the unity of the picture will decrease.

Where an image display system according to a preferred embodiment of the present invention uses a plurality of display panels, the positions of the respective display panels may be calculated individually as already described with reference to FIG. 2. Alternatively, those display panels may be classified into a main display panel and sub-display panels as will be described later. If (typically one) main display panel and (typically at least two) sub-display panels are used, then the position of the main display panel within the space may be detected first, and then the positions and configurations of the sub-display panels within the space can be detected based on the relative positions between the main and sub-display panels by a relative position sensing subsystem for detecting the relative positions and relative configurations of the main and sub-display panels. Then, the processing step of detecting the positions of the display panels can be carried out easily.

Alternatively, some of the display panels of the image display system may be shared with others, and an arbitrary one of the display panels may be identified as the main display panel by being provided with an oscillator for detecting its position and configuration. In that case, the oscillator is preferably attachable to, and removable from, the main display panel. As another alternative, at least two of the display panels may be provided with their own oscillators and shared with others. In that case, one of those display panels with the oscillators may be arbitrarily picked by the user and identified as the main display panel by selectively turning ON the oscillator thereof. The relative position sensing subsystem for the main and sub-display panels may use either an electromagnetic wave (e.g., an infrared ray) or a magnetic field.

Hereinafter, the configuration and operation of a relative position sensing subsystem that uses a magnetic field will be described with reference to FIGS. 5A and 5B.

Figure 5A:
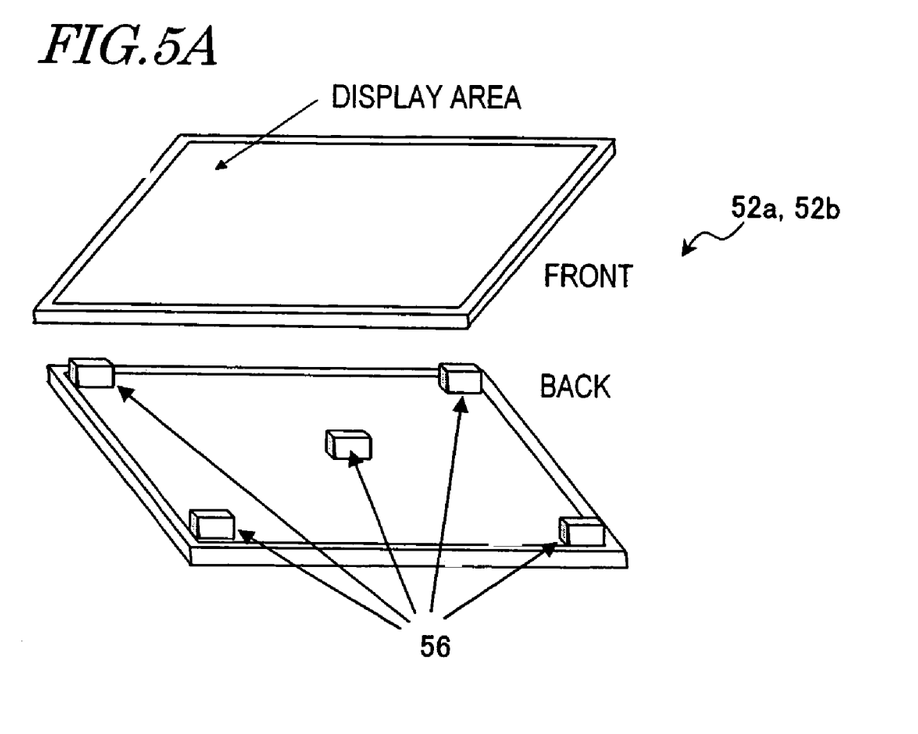
FIGS. 5A and 5B show the configuration and operation of a subsystem for detecting the relative positions of a plurality of display panels in an image display system according to a preferred embodiment of the present invention.

For example, as shown in FIG. 5A, five magnetic field units 56, each including magnetic imaging and magnetic field generating units, may be provided at the center and four corners of each of the main and sub-display panels 52a and 52b. In that case, the main display panel 52a preferably detects the relative positions of the sub-display panels 52b by the magnetic field strengths that have been detected by the magnetic field units 56.

First, the strength of the magnetic field, generated from the central magnetic field unit of the main display panel 52a, is detected by the central magnetic field unit of one of the sub-display panels 52b, thereby detecting the distance D between the central magnetic field units of the main and sub-display panels 52a and 52b.

Figure 5B:
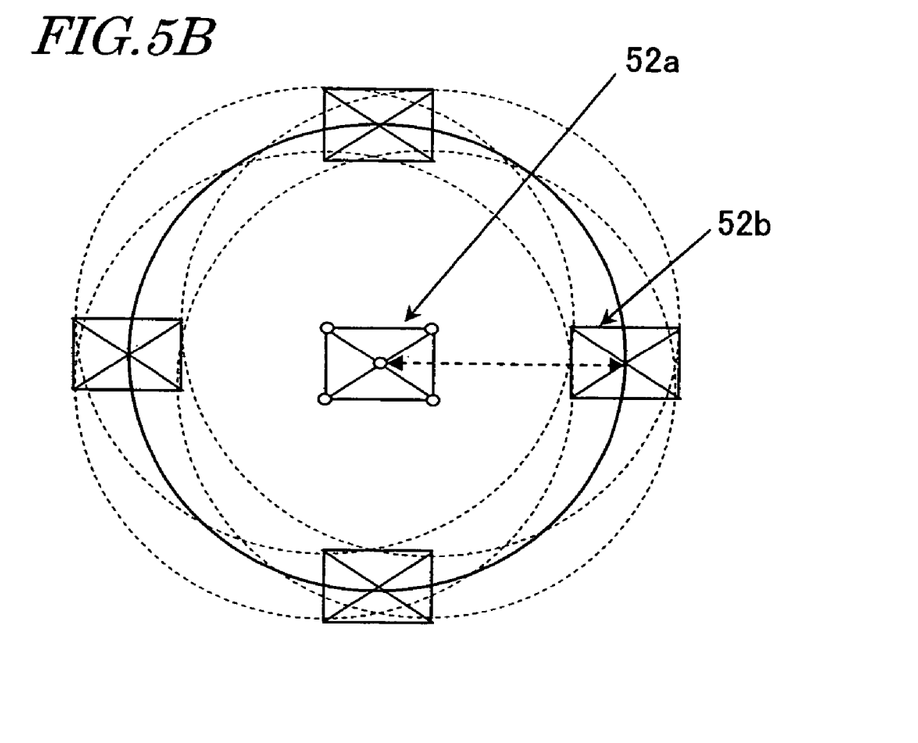

As shown in FIG. 5B, each magnetic field unit of each of the sub-display panels 52b draws a circle with the radius D around the central magnetic field unit of the main display panel 52a.

In this case, if the sub-display panel 52b is located right over the main display panel 52a, then the field strength of the upper left magnetic field unit of the sub-display panel 52b is equal to that of the upper right magnetic field unit thereof. The field strength of the lower left magnetic field unit of the sub-display panel 52b is equal to that of the lower right magnetic field unit thereof. And the field strength of the lower left and lower right magnetic field units is greater than that of the upper left and upper right magnetic field units.

On the other hand, if the sub-display panel 52b is located just on the left-hand side of the main display panel 52a, then the field strength of the upper left magnetic field unit of the sub-display panel 52b is equal to that of the lower left magnetic field unit thereof. The field strength of the upper right magnetic field unit of the sub-display panel 52b is equal to that of the lower right magnetic field unit thereof.

And the field strength of the upper left and lower left magnetic field units is greater than that of the upper right and lower right magnetic field units.

In this manner, each of the magnetic field units of each sub-display panel has its position and strength uniquely defined by the relative configuration (i.e., direction) of the sub-display panel. Thus, the direction can be calculated, and the relative position of the sub-display panel with respect to the main display panel can be detected, based on only the magnetic field strengths sensed.

It should be noted that the position of the main display panel within the space may be detected as in the image display system 100 shown in FIG. 1. Alternatively, at least three milliwave generating units may be provided within the space and the position of the main display panel may be detected by a position sensing detector provided for the main display panel. In that case, the main display panel preferably has the function of the computer 22 of the image display system 100. The position sensing detector may be provided for not just the main display panel but also the sub-display panels so as to detect the position of each sub-display panel.

Various preferred embodiments of the present invention described above provide users with a novel image display system as a new tool for using an easily portable display panel even more conveniently.

In an image display system according to a preferred embodiment of the present invention, when multiple small-sized panels are arranged, the computer can sense the relative positions of those panels and can transmit image data of a huge capacity to a target one of those panels by a wireless transmission technique. In this manner, even the image data of a huge capacity can be displayed on the target panel easily.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Application No. 2002-363243 filed on Dec. 16, 2002, the entire contents of which are herein incorporated by reference.

What is claimed is:

1. An image display system comprising:
   at least one display panel;
   a memory circuit to store predefined image information, associated with all positions within a predefined space in which the at least one display panel is provided, at least temporarily; and
   a position sensing subsystem for detecting the position of the at least one display panel within the space,
   wherein the at least one display panel presents at least a portion of the image information thereon according to its position that has been detected by the position sensing subsystem in the space, wherein the at least one display panel presents the portion of the image information in actual dimensions, and wherein
   the at least one display panel includes a main display panel and a sub-display panel, each of the main display panel and the sub-display panel being moveable within the space,
   the position sensing subsystem includes a position sensing detector which detects at least the position of the main display panel within the space, and
   the display system includes a relative position sensing subsystem for detecting the relative positions and relative configurations of the main and sub-display panels, the position and configuration of the sub-display panel within the space being detected based on the relative positions of the main and sub-display panels.

2. The image display system of claim 1, wherein the position sensing subsystem includes a detecting subsystem for detecting the configuration of the at least one display panel within the space, and
   wherein the at least one display panel presents at least a portion of the image information thereon according to its position and configuration that have been detected by the position sensing subsystem.

3. The image display system of claim 1, further comprising a display data generator for recognizing an image memory area and resolution of the at least one display panel and supplying at least a portion of the image information to the at least one display panel according to the image memory area and resolution recognized.

4. The image display system of claim 3, wherein the display data generator selects at least the portion of the image information according to the image memory area and resolution recognized, and compresses or expands the selected portion of the image information if necessary.

5. The image display system of claim 1, wherein the position sensing subsystem detects the position and/or configuration of the at least one display panel within the space at regular time intervals, and the at least one display panel refreshes the information on its display screen at the regular time intervals.

6. The image display system of claim 1, wherein
   the position sensing subsystem includes at least one oscillator, which forms an integral part of the main display panel; and
   the position sensing detector is provided within the space where the main display panel is arranged and detects at least the position of the main display panel within the space in response to a signal that has been transmitted from the at least one oscillator.

7. The image display system of claim 6, wherein multiple display panels, including the main display panel and the sub-display panel, are provided, and
   wherein the at least one oscillator is attachable to, and removable from, any of the multiple display panels, and
   wherein the display panel with the at least one oscillator attached thereto functions as the main display panel.

8. The image display system of claim 6, wherein the relative position sensing subsystem detects the relative positions and the relative configurations by using an electromagnetic wave.

9. The image display system of claim 8, wherein the electromagnetic wave is an infrared ray.

10. The image display system of claim 6, wherein the relative position sensing subsystem detects the relative positions and the relative configurations by using a magnetic field.

11. The image display system of claim 1, wherein multiple display panels, including the main display panel and the sub-display panel, are provided, and
   wherein each of the multiple display panels includes the memory circuit, and extracts an associated portion of the image information according to its position that has been detected within the space by the position sensing subsystem and presents the extracted portion thereon.

12. The image display system of claim 1, wherein the portion of the image information, which is associated with the position within the space, is information that would be unavailable tousers without this image display system.

13. The image display system of claim 1, wherein the image information is associated with absolute positions within the space.

14. The image display system of claim 13, wherein the image information includes pictures of piping and/or wiring provided near the space.

15. The image display system of claim 13, wherein the image information includes information representing an intensity distribution of an electromagnetic wave in the space.

* * * * *